May 24, 1966  H. EHRENS ETAL  3,252,474
LINE TAP VALVES

Filed May 7, 1964  2 Sheets-Sheet 1

INVENTORS
Henry Ehrens
Sidney Weiner
BY
ATTORNEY

May 24, 1966    H. EHRENS ETAL    3,252,474
LINE TAP VALVES
Filed May 7, 1964    2 Sheets-Sheet 2
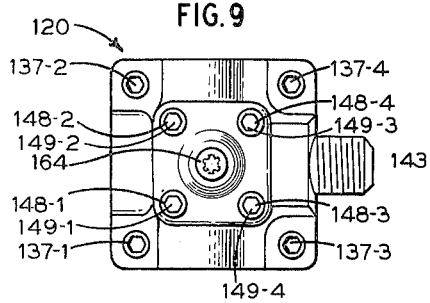
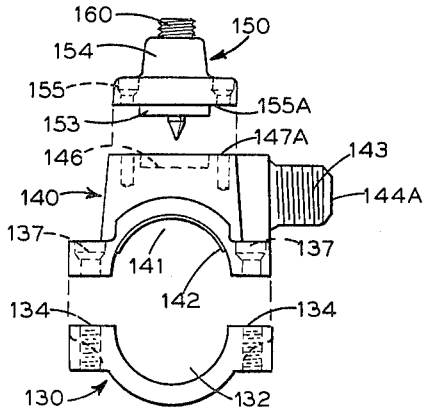
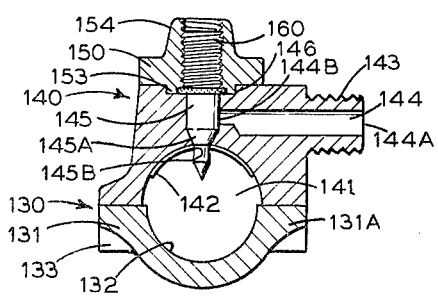
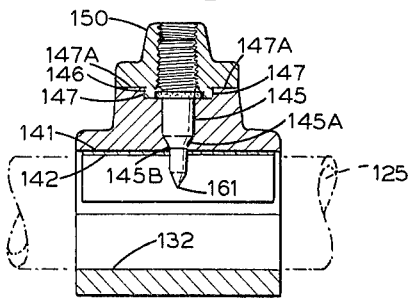
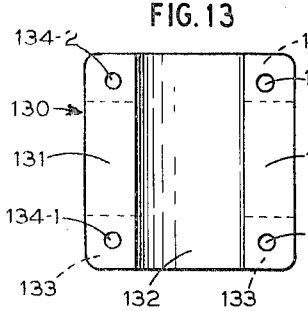
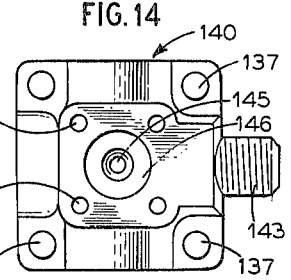
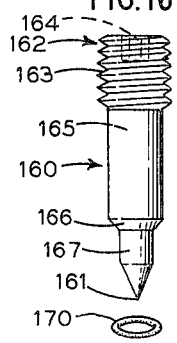
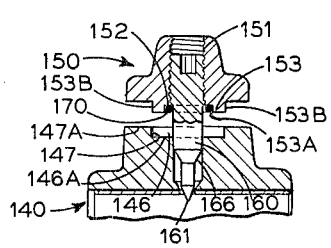
INVENTORS
Henry Ehrens
Sidney Weiner
BY S.C. Yuter
ATTORNEY

United States Patent Office 3,252,474
Patented May 24, 1966

3,252,474
LINE TAP VALVES
Henry Ehrens, Riverdale, N.Y., and Sidney Weiner, Cresskill, N.J., assignors to Sealed Unit Parts Co., Inc., Bronx, N.Y., a corporation of New York
Filed May 7, 1964, Ser. No. 366,686
6 Claims. (Cl. 137—318)

This is a continuation-in-part of application Serial No. 166,158, filed January 15, 1962, now abandoned.

This invention relates to line tap valves, for use in tapping a pipeline, generally to remove the fluid contents of the line and the system to which it may be connected, or to inject a fluid into the line and its associated system.

One field of application of the invention is referred to herein, as for a household refrigerator, merely by way of example, for use with a small pipeline, in a first modification, and to illustrate the manner in which the invention may be employed.

For example, in a household refrigerator, in which the refrigerating apparatus is disposed in a chamber or cubicle in part of the box and the remainder of the box is available for the storage of food, the space made available for the refrigerating unit has been progressively diminished in successive designs, in order to make more space available for food storage, within the limited space left available in a kitchen for such a refrigerator box.

Consequently, when the refrigerating apparatus in such a box becomes faulty, and requires servicing, access to the refrigerator apparatus is difficult when the apparatus is not to be removed from the box and taken to a repair shop. When the repairs are to be performed at the location of the box, without removing the apparatus from its compartment, or at least not too far from the vicinity of the box, it is necessary to unload the compressor of the refrigerator unit, so that the various elements and components of the refrigeration apparatus may be readily moved, either to detect the location or nature of the fault, or to correct the fault itself.

In order to simplify the unloading of the compressor and the associated apparatus, the refrigerant is removed from the system. The removal of the refrigerant, and the subsequent recharging of the system with fresh refrigerant after the repairs have been made, require access to the pipeline system. A valve to permit such access is ordinarily not provided in the refrigeration apparatus in the factory installation, for various reasons. In order to make such repairs, it is therefore necessary for the repairman to provide a valve for the pipeline system that conducts the refrigerant, so the refrigerant may be removed from the system until the repairs are made, and so a fresh refrigerant can then be injected into the system for proper operation of the refrigerator apparatus.

Considerable work has been done in the prior art to develop a valve that can be used to tap a pipeline, and, by specific application, to tap a refrigerator pipeline that carries the refrigeration fluid. Since the application of such a valve tap implies and requires the puncture of such a pipeline, as the easiest way of providing an orifice for removal of the refrigerant, and for subsequent reinjection of the refrigerant, a seal must be provided to cover the punctured hole thus made in the pipeline.

Concentional practice is such as to leave the valve elements on the pipeline and to rely upon those elements to serve as a seal for the opening formed in the pipeline to provide the tap.

One of the factors overlooked by many of the prior art devices, is the continued vibration of the pipelines of the refrigerator apparatus, due to the various unbalanced forces that are developed during operation of the motor-driven compressor.

In the prior art devices, the various constructions have been such that the elements of the valve, left as permanent seals on the pipeline, have not been symmetrical with respect to the pipeline axis and have therefore presented a center of mass, or center of gravity, radially displaced from the axis of the pipeline in the neighborhood of the tapped hole in the pipeline. Consequently, upon the vibration of the pipeline, with such eccentric mass attached thereto, the result has been to loosen those parts that were left and intended to be a permanent seal on the tapped pipeline. With such loosening, a leak developed that permitted loss of the refrigerant from the refrigerator apparatus with a consequent need for further service to repair the new damage caused by such valve.

Another difficulty caused by the vibration, naturally attending the operation of such a refrigerating apparatus, has been the tendency on the part of the repair valve parts to shift position on the pipe to which they were clamped. Excessive clamping pressure, in most cases, merely distorted the pipe section and destroyed the sealing effect of the valve elements on that pipe section. Another type of procedure in connection with such a line tap valve has employed parts to be clamped to the pipe and to support a needle to puncture the pipeline, with a master valve to be temporarily attached to such valve parts to operate the needle and puncture the pipeline and then drain the system of the refrigerant. After completion of the repairs required, a fresh charge of the refrigerant was injected into the refrigerating system through the master valve and the valve parts attached to the pipeline then suitably closed, so the master valve could then be removed from those valve parts that were to be left on the pipeline as a seal.

This last procedure represents what is probably the furthest developed method and structure of the present conventional prior art, and is particularly disclosed in U.S. Patent No. 2,827,913.

The present invention seeks to avoid the various disadvantages of the prior art and of the present conventional systems and devices.

One modification of a valve embodying the invention is made for use with small tubing, not over a half-inch in diameter. A second modification is provided for use on larger tubing or pipe of the order of one inch in diameter, for example.

On each modification a top block and a bottom block, each with a semi-circular groove, are formed to engage the tubing snugly, and arranged to be secured tightly in such snugly-fitting position, with a single needle screw supported on the top block to be movable on an axis transverse to the axis of the tubing, to be able to penetrate the tubing and then to be retractable from penetrating position to permit access to the tubing, for a fluid to flow through a passageway in the upper block leading to an outer port. The needle screw serves also as a valve element subsequently to seal off such passageway, with a sealing ring positioned around a body shank of the needle screw and arranged to be compressed against such shank and between the top block and a supporting element for the needle screw to assure a positive seal, at all times, at the surface of said body shank and between the two engaged surfaces of the top block and the supporting element for the needle screw. This is a most important feature of the invention, whereby the sealing ring provides a complete and positive seal, in all positions of the needle screw of the valve, when the valve is operatively assembled on a tubing with which the valve is to be utilized.

Both modifications represent relatively miniaturized structures arranged to permit the valve needle to be of minimum length, and thereby to permit the associated structure to be of minimum size and mass.

The construction in both modifications, whereby the length of the needle screw is reduced to a minimum, is an important feature that leads to a structure of minimum mass, particularly important in the application and use described herein.

One object of the invention is to provide a line tap valve that shall be complete in itself and not require the use of any auxiliary equipment, such as master valves.

Another object of the invention is to provide a line tap valve structure whose mass center will be relatively close to the axis of the pipeline to which the valve is attached, so that any vibration resulting from the operation of any equipment or apparatus attached to the pipeline will have a minimum effect, in any tendency to disturb the mechanically clamped relationship between the valve parts and the pipeline to which they are attached.

Another object of the invention is to provide a line tap valve, for connection to a pipeline section, with registering grooves in two clamp parts to be assembled from opposite sides of the pipeline, with a combination sectional and sealing medium between the pipe and at least one of the clamping parts of the valve, the characteristics of the material being such that the material will be comformed to the exposed surface of the pipeline to such an extent that the gripping friction of the sealing medium on the pipeline will be sufficient to withstand any torsional forces that will be developed in the valve by the resultant vibration of the pipeline due to its connection to the vibrating refrigeration apparatus.

Another object of the invention is to provide a conduit passage, in one of the valve blocks, to terminate at an inner port that can be closed at a passage disposed within a controlled valve seat and leading to a punctured hole in the pipeline, thereby eliminating the need for an external detachable master valve, and, further, thereby utilizing the already available valve seat to serve as a permanent seal when the valve seat is closed, following the completion of the repair work on the associated equipment.

Another, and particularly important, object of the invention, is to provide a valve construction, in which a single needle screw element serves to puncture the pipeline section at the point desired, to permit the refrigerant to empty out from the pipeline and its related system into the nearby conduit passage, to be collected externally in any suitable container, with the stem simultaneously serving as part of a sealing arrangement to prevent flow of the refrigerant in any other direction through the valve parts, so that all of the refrigerant may be collected in passage through and from the predetermined conduit passageway, whereupon, after completion of the repair operation, the needle valve may be moved to its full seating position at which it will effectively seal off any passage between the valve parts and the hole formed by the puncture in the pipeline.

A further object of the invention is to provide a line tap valve, of the type described, which shall have a minimum number of parts that are both economical to manufacture and relatively easy to assemble or disassemble with the need of only a simple Allen wrench to fit the needle valve itself and the clamping screws for the unit in its assembly upon the pipeline to be tapped.

The various objects as here set out, and other advantages of the valve disclosed herein, will be made apparent and pointed out in the following description, taken together with the accompanying drawings, in which:

FIGURE 9 is a plan view of the valve assembly of the second modification embodying this invention for use on large tubing;

FIGURE 10 is a side elevational view of the assembly by FIGURE 9 but shown as an exploded view;

FIGURE 11 is a vertical section of the assembly shown in FIGURE 9, with the valve needle screw stem shown in elevation for clearness;

FIGURE 12 is a vertical transverse section of the structure shown in FIGURE 11 with the needle screw stem again shown in elevation for clearness;

FIGURE 13 is a plan view of the bottom block;

FIGURE 14 is a plan view of the top block with the supporting plate removed that supports the needle screw stem;

FIGURE 15 is a bottom view of the supporting plate for the needle screw stem;

FIGURE 16 is an exploded front elevational view of the needle screw stem and perspective of the associated O-ring that serves as a seal; and FIGURE 17 is an exploded fractional view of the top and the bottom blocks, and the needle screw stem and O-ring in the sealing region between the O-ring and the other related elements of the valve.

Figure 1:
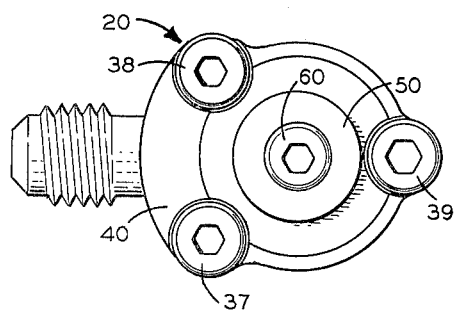
FIGURE 1 is a plan view of the valve assembly of one modification embodying this invention for use on small tubing.

As shown in the drawings, a line tap valve 20 which is to be fitted to a pipeline 25 to puncture a hole in that pipeline, comprises a base or bottom block 30, a top or head block 40, a cap ring 50 and a needle screw 60. As shown in FIGURE 5, the base block 30 is provided with a transverse groove 32 that is semi-cylindrical in form to accommodate and fit snugly around the bottom of a pipe of corresponding radius, to which the valve is to be applied. The top surface 33 of the base block 30 is planar and relatively as smooth as possible. Similarly, the groove 32 should have a relatively smooth surface throughout its contour. Three threaded bolt holes 34, 35 and 36 are provided to receive the ends of three clamping bolts 37, 38 and 39, shown in FIGURE 1 and otherwise indicated in FIGURES 3 and 4.

Figure 3:
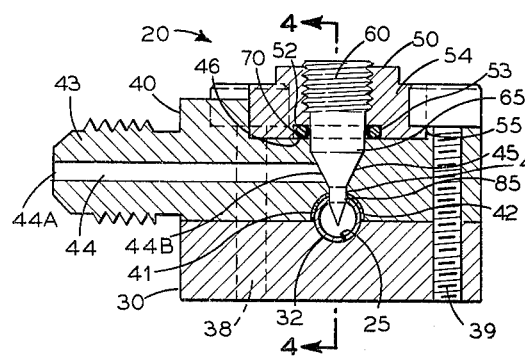
FIGURE 3 is a vertical section of the assembly as shown in FIGURE 2, with the valve stem shown in elevation for clearness.
Figure 4:
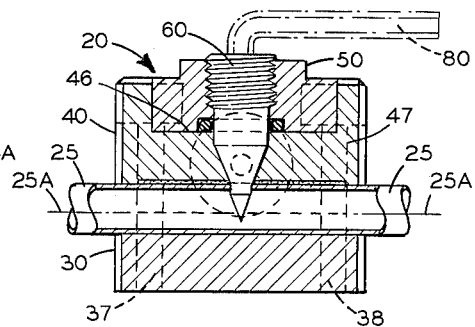
FIGURE 4 is a vertical transverse section of the structure shown in FIGURE 2, taken along the lines 4—4 and in the direction indicated by those lines in FIGURE 3.
Figure 5:
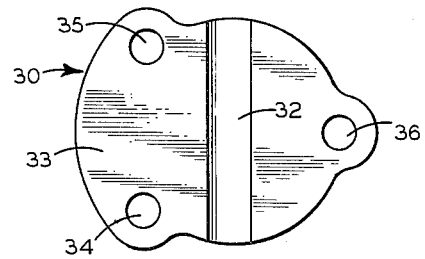
FIGURE 5 is a plan view of the base block to fit along the bottom of a pipe section to be tapped.

As shown in FIGURES 3 and 4, the base block 30 and the top block 40 are fitted together to encircle the pipeline 25 which is to be punctured.

The top block 40 is provided with a transverse groove 41 to register the groove 32 in the lower or base block 30. The upper groove 41 is shaped around the same center axis as the lower groove 32, but the radius of the upper groove 41 is slightly larger than that of the lower groove 32, in order to accommodate a thin shaped layer 42 of sealing material having an inner contour surface of a radius corresponding to that of the lower groove 32.

When the bottom block 30 and the top block 40 are pressed together to encircle the pipe 25, the pipe will seat snugly in the groove 32 and in the corresponding groove in the sealing material 42 with a slight spacing left between the bottom surface of the top block 40 and the top surface of the bottom block 30 to permit the tightening of the clamping bolts 37, 38 and 39 to put the sealing material 42 in sufficient compression, together with the pipe 25, to assure a tight, frictional bond between the sealing material 42 and the pipe 25 to assure that the fixed relationship between the valve unit and the pipe section 25 will not be loosened or affected by the vibration experienced by the pipe during subsequent operation of the refrigerating equipment.

The use of this sealing material with a characteristic large coefficient of friction, and shaped generally to conform to the contour of the pipe, is one of the important features of this invention. It serves as a permanent seal around the orifice or hole that is punctured or pierced into the pipe, and is effective both during and after the draining and refilling operation and the resealing of the valve unit.

Another feature of the invention is the provision of a spout 43 on the top block 40, provided with a central bore 44 to serve as a transfer passageway for fluid from the pipe 25 to an external connection, that may be made to the spout 43 to receive and conserve the refrigerator fluid from the pipe 25. Subsequently, after repairs, the passage 44 serves to deliver a quantity of the fluid to recharge the system.

For convenience of reference, the transfer passage 44 has an outer port 44A and an inner port 44B.

Figure 6:
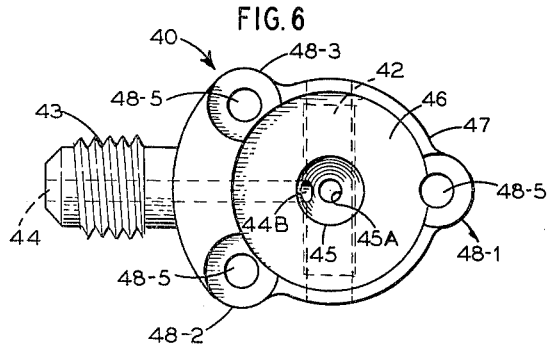
FIGURE 6 is a plan view of the top or head block that seats on the top of the pipe section to be tapped.

A further feature of the invention is the location as well as the provision of the inner port 44B of the transfer passage 44. As shown in FIGURES 3, 4 and 6, the inner port 44B is located intermediate the top and bottom planes or edges of a conical valve seat or surface 45. The axis of that conical valve seat 45 is preferably in a plane containing the axis of the pipe 25 and is located preferably perpendicular to the axis of the pipe 25. The conical valve seat recess 45 communicates with the groove 41 at the bottom of block 40.

The conical seat 45 serves to receive a correspondingly shaped tapered surface on the lower part of the shank of the threaded needle 60, presently to be described.

Figure 7:
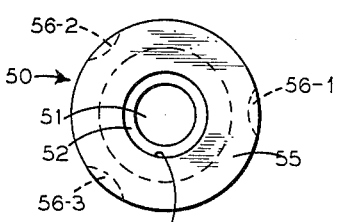
FIGURE 7 is a plan view of a cap which serves as the support for the needle valve.

As shown in FIGURES 3, 4 and 6, the upper block 40 is provided with a circular recess or seating cavity 46, concentric with the axis of the conical surface 45, to accommodate and to permit the nesting of the needle-supporting cap ring 50 of FIGURES 3 and 7. The circular recess 46 is encircled by the border rim 47, which is equivalent to a substantially circular boss encircling the seating cavity 46. The border 47 embodies the three enlarged bosses 48–1, 48–2 and 48–3 with axial bolt holes 48–5 for accommodating the respective bolts 37, 38 and 39, identified in FIGURE 1. As may be seen in FIGURE 3, the top surface of each of the three bosses 48–1, 48–2 and 48–3, is disposed slightly above the surface of the circular seating area 46, for the cap 50, so the bolt heads that engage the top surfaces of the bosses 48–1, 48–2 and 48–3 will also serve to clamp adjacent toe pieces on the cap ring 50, which will now be described in connection with FIGURE 7.

As shown in FIGURE 3, in section, and in FIGURE 7, in bottom plan, the cap ring 50 is substantially symmetrical about a central axis, and is provided with a central bore 51, with a bottom annular seat 52 formed as a shoulder between the bore 51 and a circular rim wall 53 which will serve as a confining wall for the outer or peripheral rim of an O-ring that will function with the threaded needle 60 to establish a positive seal between the bore 51 of the ring 50 and the pipelinne 25 to which the valve is to be attached. This will be further explained in connection with the description of the threaded needle 60.

The cap ring 50 further embodies an annular body section 54 and a bottom annular flange seating portion 55 (FIGURES 3 and 7) whose diameter is such as to permit the cap ring 50 to slip fit into the circular cavity 46 in the top block 40. The seating flange 55, of cap ring 50, is provided with three surface recesses 56–1, 56–2 and 56–3, formed in the top surface of the annular seating flange 55, as arcuate segments to accommodate the head of the associated bolts 37, 38 or 39 as the bolt is moved to clamping position to clamp the elements of the valve together.

The function of the cap ring 50 is to support the threaded needle 60, and to cooperate with the threaded needle and the top surface of the upper block 40 to provide a temporary seal during the unloading of the pipeline in removing the refrigerant therefrom, and, subsequently, to provide a permanent back-up seal in addition to the valve seat seal, when the threaded needle is moved back down to the sealing position after the repairs and the refilling operation into the pipe line 25 have been completed.

Figure 8:
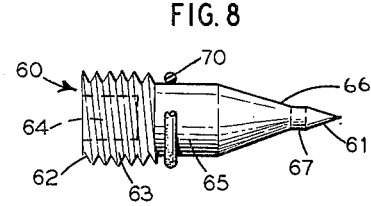
FIGURE 8 is a side elevational view of the needle valve.

The detailed construction of the threaded needle 60 may now be considered, as shown in FIGURE 8, particularly in connection with its manner of functioning, as may be seen upon reference to FIGURES 3 and 4.

As shown in FIGURE 8, the threaded needle 60 embodies a needle or point 61, and a head 62 having a threaded portion 63 with an hexagonal recess 64 to accommodate an Allen wrench for rotating the threaded needle. Any other form of recess and suitable actuator may be employed. The threaded needle 60 further embodies a cylindrical shank 65 co-axial with the head 62, and a truncated conical seating section 66, with a short narrow shank extension 67 from the small end of the truncated conical section 66 to the back of the needle or point 61.

On O-ring 70 is shown associated with the threaded needle 60, and is of appropriate dimension to have an internal diameter slightly less than the diameter of the shank portion 65 so that the O-ring will fit snugly on that shank portion 65 when pressed thereon. At the same time the outer dimension of the O-ring 70, as may be seen more clearly upon reference to FIGURE 3, should be such as to be compressed tightly between the shoulder 52 and the top surface 46 of the block 40 while at the same time being tightly confined between the surface of the shank 65, of the threaded needle 60, and the confining rim or wall surface 53. The function of the valve and the various parts thereof may now be reviewed.

The three block elements including the base block 30, the upper or top block 40 and the cap ring 50 are all made of relatively soft metal such as white metal or aluminum, preferably, in order to keep the mass of the unit to a minimum. The threaded needle 60 is preferably of a hard metal, such as one of the steel elements or alloys that will particularly withstand any chemical effects of the refrigerant that will be used in the system.

Figure 2:
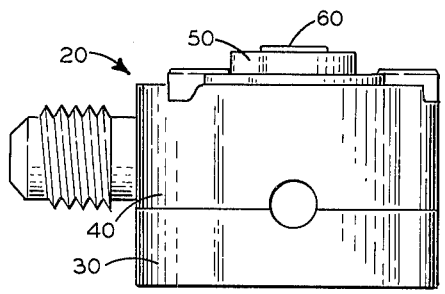
FIGURE 2 is a side elevational view of the assembly shown in FIGURE 1.

When the location of the point is determined at which the pipeline 25 is to be tapped, the two blocks 30 and 40 are positioned to encircle the pipeline 25 at that region, and the cap ring 50 is also in position in the top block 40, preferably with the threaded needle 60 and its related sealing O-ring 70 in place. The threaded needle 60 may be relatively in its elevated terminal position, since the O-ring 70 will be safely held against casual displacement. The three blocks 30, 40 and the ring 50 are now suitably bolted together by the cap bolts 37, 38 and 39, so the complete valve unit, as assembled on the pipe in accordance with FIGURE 3 and FIGURE 4, will constitute a compactly assembled mass on the pipeline having an external contour substantially as shown in FIGURE 2 and indicated in FIGURES 3 and 4.

By means of an Allen wrench 80 as shown in FIGURE 4, the threaded needle 60 may be rotated to advance its needle point 61 sufficiently to penetrate the wall and puncture the wall of the pipe 25 to provide the desired opening in that pipe through which the fluid in the pipe may be removed, and subsequently either the same or an alternate fluid recharged back into the pipe.

After the pipe 25 is punctured, the threaded needle 61 is retracted to permit the fluid from pipe 25 to pass through the punctured opening 85 in the pipe 25 and thence through the bottom bore 45A into the conical chamber outlined by the conical valve seat 45, and from thence into the transfer passage 44 out to the port 44A in the threaded spout 43.

Any repair work that is to be done to the refrigerating apparatus may now be safely performed, since the equipment is now unloaded by the removal of the refrigerant.

It will be observed, upon reference to FIGURE 3, that during the passage of the refrigerant from the pipe 25 into the transfer passage 44 and out through the port 44A, the refrigerant fluid, either as a liquid or as a gas, could not move upward past the threaded needle shank 65 or even upward and out through the space between the floor surface 46 of the central circular cavity 46 in the upper block and the bottom surface of the cap ring 50, since in both cases the sealing O-ring 70 serves to seal both the path along the surface of the shank 65 and also the horizontal path between the two surfaces represented by the circular pocket 46 and the cap ring 50.

After the repair work to the apparatus has been completed, the new charge of refrigerant may then be inserted through the outer port 44A of the transfer passage 44, and such newly injected refrigerant or other fluid, depending upon the nature of the system, will move inward through the transfer passage and the inlet port 44B through the bore opening 45A and into the pipe 25. After the desired volume of such recharge fluid is injected into the pipe 25 the threaded needle is then threaded downwardly against the tapered surface 45, which now acts as a valve seat with the truncated conical section 66 of the threaded needle 60 serving as a valve closure.

The location of the inner port 44B in the side wall of the valve seat 45, intermediate the top and bottom planes of that tapered valve seat 45, becomes now apparent.

This location of that inner port 45B of the transfer passage 44 within the surface area controlled by the valve seat, is an important feature of the present invention.

When the threaded needle 60 is now moved home to its valve seating position, the truncated conical shank section 66 presses downward against the conical seating surface 45 and completely closes off the inner port 44B, thus providing a complete positive mechanical seal between the passage 44 and the hole 85 punctured into the side wall of the pipe 25.

At the same time the O-ring seal 70 continues to serve as a second seal against fluid movement past any part of the flange portion 65, to an outer region.

As an additional feature in providing a positive mechanical seal at the inner port 44B, the taper of the valve seat 45 may be made one or two degrees off from the taper of the conical valve shank section 66, so the pressure imparted to the hard threaded needle body will reform the angular surface disposition of the valve seat 45 to fit exactly the taper of the hardened shank 66.

An important feature of the invention is the formation of the top block and cap ring as two pieces, to enable the O-ring seal to be placed close to the hole in the pipe, and also between that hole in the pipe and the threaded head of the screw needle. As a result, the screw needle, of relatively miniature size, accomplishes (1) piercing, (2) seating, (3) shaft sealing, in conjunction with the O-ring, and (4) threading to operate the needle, all within a dimension of 5/8 inch, which is not achievable by anything in the prior art.

Here has thus been disclosed a line tap valve which may be easily applied to a pipeline, to tap the line to remove fluid, liquid or gas, from the system, to permit repairs or the like, when necessary, after which a fluid may be injected into the pipeline and the tap closed and sealed.

The construction has been simplified over conventional devices to enable a single screw needle to perform the puncturing and various sealing operations with a minimum of structural elements.

The details of construction and arrangement of a second modification of the valve of this invention are shown in FIGURES 9 to 17, inclusive. For convenience of reference, corresponding elements or components of the second modification are identified by numerals corresponding to those applied to the first modification but in the 100 series to identify the same element in the second modification.

As shown in FIGURE 9, the line tap valve 120 is to be fitted to a pipeline 125 to puncture a hole in that pipeline. The valve 120 comprises a bottom block 130, a top block 140, a cap 150 and a needle screw stem 160. The base block 130 is provided with a transverse groove or cavity 132 that is semi-cylindrical in form to fit snugly around the outer surface of the pipe or tubing 125 to which the valve 120 is to be applied. Two side flanges 131 and 131A support a boss 133 at each end of the flange on the under surface of the flange with threaded bolt holes 134–1 to 134–4 in the bosses 133 to receive clamping bolts 137–1 to 137–4. The top block 140 is also provided with a transverse groove 141 to engage the top of the pipeline 125 which is to be punctured.

As in the case of the first modification, the upper groove 141 is shaped around the same center axis as the lower groove 132, but the radius of the upper groove 141 is slightly larger than that in the lower groove 132, in order to accommodate a thin shaped layer 142 of sealing material that is slightly compressible and yet is arranged to have an inner contour surface of a radius corresponding to that of the lower groove 132 in the base block 130.

As in the first modification, when the two blocks, the top block 140 and the bottom block 130 of the second modification, are pressed together to encircle the pipe 125, the pipe will seat snugly in the two grooves, with a slight spacing left between the bottom surface of the top block and the top surface of the bottom block, to permit tightening of the clamping bolts 137–1 to 137–4 to put the sealing material 142 in sufficient compression around the pipe 125, to assure tight-sealing action between the top valve block 140 and the pipe 125, around the hole that will be formed in the pipe 125 by the puncturing action of the needle screw stem 160. As previously mentioned, this is one of the important features of this invention, and is shown as applied in both modifications.

The top block 140 is provided with a spout 143 with a central bore 144 that serves as a transfer passageway between the pipe 125 and an external fluid-receiving or fluid-delivering apparatus. The transfer passageway 144 is shown to have an outer port 144A and an inner port 144B. The manner in which the inner end of the passageway may be permitted communication with the pipe, or sealed off from the pipe by the needle screw stem 160 as a valve, is indicated in FIGURES 11 and 12.

The upper block 140 is provided with a vertical cylindrical bore 145 which narrows to a concentric co-axial conical valve seat surface 145A and then continues co-axially to a continuing bore of reduced diameter 145B. At the top of the cylindrical bore 145 is an annular recess or seating cavity 146 concentric with the axis of the cylindrical bore 145. The circular annular recess or cavity 146 with a floor 146A is encircled by a border wall 147 having a flat top seating surface 147A to receive the cap 150. Four bolt holes 148–1 to 148–4 for accommodating bolts 149–1 to 149–4 for tightly securing the cap 150 to the top block 140, in order, at the same time, to put pressure on an O-ring 170 held in position in the cap 150 to be compressed to perform the sealing action that is a primary feature of this invention.

As will be seen in FIGURES 11 and 17, that show the vertical cross sections of the valve, and FIGURE 15 which shows the bottom of cap 150, the cap 150 is formed with a central bore 151 and with a bottom annular seat 152 formed as a shoulder between the bore 151 and a circular rim wall 153A of a circular pilot ring 153. The circular pilot ring 153 serves as an outer confining wall for the outer peripheral rim of the O-ring 170 that will function with the threaded needle stem 160 to establish a positive seal between the bore 151 of the cap 150 and the pipe line 125 to which the valve is to be attached. This will be further explained in connection with the description of the threaded needle stem 160 in FIGURES 16 and 17.

The cap 150 embodies a central body post section 154 and a bottom square flange seating portion 155 with a flat bottom seating surface 155A as adapted to seat on the top surface 147A of the top block 140, as in FIGURE 10.

In this modification, the annular ring 153 on the bottom of the cap 150 serves a double function. First, it provides the inner circular wall surface 153A against which the O-ring 170 will press, or be pressed during compression, to provide a positive seal between that circular surface 153A and the bore 145 of the top block 140.

A second function of the annular ring 153 at the bottom of the cap 150 is to provide a co-axial and concentric pilot element which will seat concentrically in the concentric annular cavity 146 at the top of the top block 140, so the outer peripheral surface 153B will engage the circular border wall 147 that defines and encircles the annular cavity 146.

By reason of the construction thus shown, the cap 150 provides a relatively symmetrical co-axial structure that may be co-axially positioned at random angularly, with its corner bolt holes 148-1 to 148-4 in alignment with the correspondingly related bolt holes 148A to 148D in the top surface of the top block 140.

The pilot annular ring 153 assures that the cap 150 will be always properly positioned in co-axial and concentric position with respect to the bore 145 in the top block 140, when assembled on the top block.

In this second modification of the valve of this invention, substantial flexibility is achieved in assembling the valve, as is particularly desirable when the piping is of the larger diameter for which the valve is provided, by permitting the two blocks, the top block 140 and the bottom block 130, to be first tightly coupled to the piping 125, and then the cap 150 for supporting the needle 160 is separately secured tightly to the top block 140. In this manner, by reason of the separate tightening operations, the ultimate desired proper relationship physically between the several elements is assured.

The function of the cap 150 is to support the threaded needle stem 160 and to co-operate with the needle and the top surface 152 of the top block 140 to provide a temporary seal during the unloading of the pipeline 125 and subsequently, to provide a permanent back-up seal at the upper end of the bore 145, when the threaded needle is moved forward and downward to its lowermost position at which a lower region of the needle shank will engage the valve seat surface 145A to establish a valve closing function at a location between the pipe 125 and the passageway 144 to the exit.

The detailed construction of threaded needle stem 160 is shown in FIGURE 16, and may be considered particularly in connection with its manner of functioning as shown in FIGURES 11, 12 and 17.

As shown in FIGURE 16, the threaded needle stem 160 embodies a needle or point 161 and a head 162 having a threaded portion 163 with a hexagonal recess 164 to accommodate an Allen wrench for rotating the threaded needle. Any other form of recess may be employed for a corresponding suitable actuator for the needle. The threaded needle stem 160 further embodies a cylindrical shank 165 coaxial with the head 162, a coaxial truncated conical seating section 166 leading to a short narrower shank extension 167 from the small end of the truncated conical section 166 to the back of the needle or point 161.

The O-ring 170 is shown in perspective, in FIGURE 16, separately from stem 160 and is of appropriate dimension to have an internal diameter slightly less than the diameter of the upper shank portion 165, so the O-ring 170 will have an initially snug fit on that shank portion 165 when assembled thereon. At the same time, the outer dimension of the O-ring 170 should be slightly larger than the diameter of the inner circular rim surface 153A of pilot ring 153, so the O-ring 170 will be under some slight compression both against the rim surface 153A of pilot ring 153 and the shank surface 165 of the needle stem 160, before the O-ring 170 is further compressed between the cap 150 and the top block 140 at surfaces 152 and 146A (FIGURE 17) by the threaded bolts 148-1 to 148-4. Under those conditions, the O-ring 170 will be further compressed vertically between the annular surface 152 of the cap 150, and the top surface 146A on which the annular pilot 153 of the cap 150 is aligned.

As the cap 150 is tightened onto the top block 140, the O-ring 170 is compressed to establish a positive seal on four relatively perpendicular surfaces, namely, the two relatively perpendicular surfaces 152 and 153A on the bottom of the cap 150 and within pilot ring 153, the peripheral shank surface 165 on the needle stem 160, and the annular floor surface 146A of the top block immediately encircling the bore 145. With the O-ring 170 compressed and establishing a positive seal on those four surfaces, a positive closure seal is established at the top of the bore 145.

When actuated by an Allen wrench, the needle stem 160 may be rotated to advance its needle point 161 sufficiently to penetrate the wall of the pipe 125 to provide the desired opening in that pipe. Through that opening the fluid may then be removed, and through that opening subsequently, the same or a substitute fluid may be recharged back into the pipe. The threaded needle stem 160 may thus be advanced or retracted, as desired, while maintaining a positive seal at the O-ring 170 and the four surfaces engaged by said O-ring. By means of the construction shown, the sealing action of the O-ring is established in all positions of the threaded needle stem 160. As in the case of the first modification, the sealing O-ring 170 serves to seal the path along the surface of the shank 165, and also the horizontal path along the surface represented by the floor 146A of the annular pocket or cavity 146, and also the path along the two surfaces 152 and 153A on the under surface of the cap 150.

When the operation involving emptying and refilling the pipe 125 is completed and it is desired to seal off the pipe 125, the threaded needle stem 160 is then threaded downwardly until the tapered surface 166 on the shank 165 of the needle stem engages the correspondingly tapered surface 145A at the lower end of the bore 145 in the top block 140. These two engaging tapered surfaces 166 and 145A function together as a valve seat and valve closure, to close off the communication between the pipe 125 and the coupling passage 144.

Again, as in the case of the first modification, the placement of the O-ring seal close to the hole in the pipe, and between the pipe and the threaded head of the screw needle stem, permits the needle to be made of relatively short dimension, while at the same time enabling the needle to accomplish (1) piercing, (2) seating, (3) shaft sealing, in conjunction with the O-ring, and (4) threading to operate the needle, all within a short dimension, whereby miniaturization of the needle and of the valve parts are effectively achieved.

As indicated above, an important object of this invention is the provision of a sealing medium between the valve and the pipe that will withstand external forces, and thereby serve as a permanent, non-deteriorating seal.

In the prior art devices, soft rubber gaskets have been employed to seal the puncture in the tube, since soft rubber would deform readily and conform to any uneven surface surrounding the puncture, thereby permitting greater tolerances in the valves, so they did not have to be critical or well engineered.

Rubber has disadvantages, however, because it is not permanent. The resiliency characteristic which favors its use in the first place, changes with time and because of contact with chemicals, namely, the refrigerant and oil. Consequently, its resistance to pressure changes.

In the refrigeration industry, for example, it is known that a line tap that has a rubber seal must not be installed on the discharge tube of a refrigerating unit because the heat of compression destroys the rubber, and the refrigerant leaks out through the destroyed rubber seal.

In the present valve, the gasket 142 is made to serve permanently in its environment, under all conditions. The gasket is made of compressed asbestos with a neoprene binder. Since such gasket is not pliable, like rubber, to adapt to any irregularities of the pipe, near the puncture, and is only slightly compressible, the valve design is made such as to provide adequate pressure to assure that the tube with its irregularities will be caused to conform to the preformed contour of the gasket.

Such pressure is achieved by the three cap screws 37, 38 and 39 of the first modification, and by the four screws 137–1 to 137–4 of the second modification. With these cap screws, upward of sixty inch pounds of torque can be achieved, as by a small Allen wrench 80, shown in FIG. 4.

As a further feature to achieve the pressure desired, the inner contour surface of the sealing gasket 142, and the radius of the groove 132 in the bottom block 130, are about twenty thousandths (0.020) of an inch undersized, so that when the two blocks approach, under tension of the cap screws, the tubing between the two blocks is forced to conform to the surface contour of the gasket 142.

The properties of the compressed asbestos gasket are such that the effective sealing pressure limits improve with time and heat, and an action similar to vulcanizing takes place under the exerted pressure force, plus time and heat on the gasket. Deterioration in use does not occur in the gasket, which is essentially indestructible in that application, and lasts indefinitely.

The valve may be modified in shape and form without departing from the spirit and scope of the invention, as described, and as set forth in the claims.

What is claimed is:

1. A line tap valve comprising a top block and a co-fitting bottom block for fitting around a pipeline to be tapped; a reciprocable needle valve to puncture such pipeline, said needle valve having a threaded surface adjacent its top portion and an intermediate stem shank having a smooth surface; an O-ring encircling and sealingly engaging said stem shank of the needle valve in all positions of said needle valve; and cap means mounted on said top block having an internal threaded bore above said O-ring for engaging the threaded surface of the needle valve for forward movement to puncture said pipeline and for retracting movement to expose a puncture thus formed in said pipeline; the top block having a conduit passage beneath said O-ring and from the pipeline where so punctured, said passage defined in part by a valve seat engageable by said needle valve to arrest flow through said passage, and said needle valve being movable to an open position wherein flow communication is established between said passage and a hole formed in said pipeline by said needle valve; said cap means having a plurality of openings laterally displaced from and parallel to said threaded bore, a plurality of screw means passing through said openings for connecting said cap means to said top block and for pressing said cap means tightly against said top block and thereby clamping said O-ring in fixed position against said stem shank of said needle valve and against a surface of said top block to maintain a seal between said stem shank of said needle valve and said top block at all positions of said needle valve.

2. A line tap valve comprising a base block having a groove with a given radius substantially equal to the radius of a pipeline to be tapped to engage one side of the pipeline; a top block having a groove with said given radius to engage the other side of the pipeline and also having a conduit passage connecting with its groove; a threaded needle element having a sharp point and adjustably threaded in said top block for axially moving said needle element by rotation of said needle element to press its sharp point into the pipeline where the conduit passage connects to the groove of said top block and thereby to puncture such pipeline; a substantially noncompressible liner between the top block and the pipeline having a given thickness and shaped to have a curvature corresponding to the contour of the pipeline; and means for clamping the two blocks tightly to press said liner against the pipeline to constrict said pipeline said given thickness in the area of said pipeline beneath said liner and to establish a seal around the hole punctured into said pipeline, said needle element being movable to an open position wherein flow communication is established between the conduit passage and a hole punctured into said pipeline.

3. A line tap valve comprising a base having a transverse semi-cylindrical groove across a top surface plane; a top block to seat planarly on the base, said top block having a groove across its bottom surface plane to register with the groove in the base to provide a space to accommodate a pipeline to be tapped, the surface in the groove of the top block being lined with a layer of sealing material to engage the surface of the pipeline to be tapped, said top block also having a vertical hole therethrough into a middle region of the grove with a tapered seat just about the entrance port of the hole into the groove, and a tap-off passage through the body of the block communicating from the outside of the block to said vertical hole; a cap having a threaded central bore to accommodate a threaded screw needle and having an annular recess with a shoulder on its under surface concentric with said bore; a screw needle valve having a tapered portion to fit snugly on said tapered seat, and having a sharp tip beneath said tapered portion to puncture a pipeline held between the base and the top block, and also having an integral threaded head or top portion to thread into the threaded bore of said cap, with a smooth-surfaced shank between the threaded head and the tapered seating portion; a sealing ring snugly encircling the smooth-surfaces shank of the needle valve above said tap-off passage and seating on the shoulder in the bottom recess of the cap to provide a seal between the cap and the top block; flow communication being established between a hole formed in the pipeline by the needle valve and the tap-off passage upon movement of the needle valve to a valve open position and such flow communication being arrested upon engagement of the tapered portion and tapered seat; said cap also having a plurality of openings laterally displaced from and parallel to said threaded bore, a plurality of clamping screws passing through said openings for clamping the cap to the top block to compress said sealing ring, and means for clamping the block to the base to compress the layer of sealing material on the pipeline around the tip of the needle valve, said screw needle valve being moved down the vertical hole of said top block solely by rotation of the threaded head of said screw needle valve within the threaded central bore of said cap, thereby to puncture the pipeline.

4. A line tap valve comprising a base block having a planar top surface with a transverse semi-cylindrical groove having a given radius substantially equal to the radius of the pipeline to be engaged; a top block having a planar bottom surface to seat on the base block and having a transverse groove having said given radius to register with the groove in the base block to provide jointly a space for accommodating a pipeline to be tapped, said top block having a vertical opening symmetrical about an axis perpendicular to the axis of the groove, said vertical opening having an upper portion defined by a side wall tapered convergingly downward to serve as a valve seat, and said top block having a tap-off passage with an outer port communicating between the outside and said vertical opening; a cap to seat on the top block, said cap having a threaded central bore; a needle valve having a threaded head, to screw into the threaded central bore of said cap, and having a cylindrical smooth-surfaced shank leading to a tapered portion to serve as a closure on the tapered seat in the cover block, and said needle valve having a sharp needle element at the forward end of the tapered shank portion for puncturing the side wall of a pipeline held between the top and the base blocks by moving said needle valve down said vertical opening solely by rotation of said needle valve; a substantially noncompressible sealing element in one groove having a given thickness and characterized to be comformable to the pipeline surface around a hole formed in such pipeline by the needle element; a sealing ring snugly encircling the cylindrical smooth-surfaced shank of the needle valve above said passage in said top block; and means for clamping the cap to the top block, and the top block to the base to constrict the portion of the pipeline beneath said sealing element; flow communication being established between a hole formed in the pipeline by the needle valve and the tap-off passage upon movement of the needle valve to a valve open position and such flow communication being arrested upon engagement of the tapered portion and tapered seat.

5. A line tap valve comprising a base having a groove in a top surface, a top block having a groove in a bottom surface, so both blocks can be fitted together around a pipeline to be tapped, said top block having a bore from a top surface to the groove, with a tapered wall portion to serve as a valve seat, and with a tap-off passage communicating from an outer port to said bore; a cap having a threaded bore co-axial with the bore in the top block, and having an annular shoulder on its surface concentric with the related portion of the bore; a sealing ring to seat on said shoulder; a screw needle having (1) an integral threaded head to be adjustably threaded in the cap, and having (2) a straight smooth-surfaced shank beneath said integral threaded head to fit snugly within said sealing ring, and having (3) a convergingly tapered shank beneath said straight smooth-surfaced shank to seat comformably on said tapered valve seat in said top block, and having (4) a needle portion beneath said convergingly tapered shank for puncturing a pipeline held between said two blocks by movement down said bore solely by virtue of rotation of said screw needle; and clamping means for tightly clamping the cap and the two blocks as a compact structural unit; said cap having a plurality of openings displaced from and parallel to said threaded bore, and said clamping means comprising a plurality of screw means passing through said openings.

6. A line tap valve comprising a base block with a groove substantially equal to the radius of the pipeline to be tapped having a given radius to fit one side of the pipeline to be tapped; a top block with a groove having said given radius to be positioned on the other side of the pipeline and in registry with the groove of the base block; means for clamping the base block to the top block; a relatively noncompressible sealing liner in one of said grooves to cover an area of the pipe surface and contoured to the curvature of the pipe to constrict the pipe in the covered area; a flow passage defined in part by a tapered valve seat in the top block; a needle element having a needle point and supported in the top block for adjustable movement to puncture a hole in the pipeline held between the two blocks, the needle element having a tapered shank above and spaced from the needle point, said tapered shank serving to fit snugly in the tapered seat in the top block as a seal when so positioned; and means providing a transfer passage from outside the valve to a port terminating at and defined in the surface area in the tapered valve seat, whereby flow communication is established between a hole formed in the pipeline by the needle element and the transfer passage upon movement of the needle element to a valve open position and such flow communication is arrested upon engagement of the tapered shank and tapered seat.

References Cited by the Examiner

UNITED STATES PATENTS

| 2,608,989 | 9/1952 | McDonald | 137—318 |
| 2,660,192 | 11/1953 | Hunter | 137—318 |
| 2,794,352 | 6/1957 | Mueller | 77—42 |
| 2,827,913 | 3/1958 | Wagner | 137—318 |
| 3,038,490 | 6/1962 | Yocum | 137—318 |
| 3,045,511 | 7/1962 | Risley | 77—38 |
| 3,115,889 | 12/1963 | Franck | 137—318 |

FOREIGN PATENTS

| 964,354 | 1/1950 | France. |
| 505,046 | 5/1939 | Great Britain. |
| 726,795 | 3/1955 | Great Britain. |
| 505,675 | 12/1954 | Italy. |

OTHER REFERENCES

Machine Design, The Seals Book, Penton Publishing Company, Jan. 19, 1961.

ISADOR WEIL, *Primary Examiner.*

M. CARY NELSON, *Examiner.*